May 21, 1963 T. HUBKA ETAL 3,090,955
TEST INSTRUMENT FOR DOPPLER RADAR SYSTEMS
Filed April 28, 1960 2 Sheets-Sheet 1

*INVENTORS*
THEODORE HUBKA
ARTHUR C. BLUMENFELD
BY
ATTORNEY.

INVENTOR.
THEODORE HUBKA
ARTHUR C. BLUMENFELD

United States Patent Office 3,090,955
Patented May 21, 1963

3,090,955
TEST INSTRUMENT FOR DOPPLER RADAR SYSTEMS
Theodore Hubka, Briarcliff Manor, and Arthur C. Blumenfeld, Brewster, N.Y., assignors to General Precision, Inc., a corporation of Delaware
Filed Apr. 28, 1960, Ser. No. 25,302
2 Claims. (Cl. 343—17.7)

This invention relates generally to radar test instruments and particularly to a test instrument suitable for use with an airborne Doppler radar navigation system.

The familiar search radar system sends out pulses of microwave energy which, after reflection from various objects, are received and detected, thereby generating a voltage pulse corresponding to the envelope of the received microwave pulse. The time of reception of this pulse relative to the time of pulse transmission together with the orientation of the antenna are indicative of the distance and direction from the station of the object from which the pulse was reflected. In such systems the frequency of the reflected signal is not, in general, significant, usually being treated as the same as that of the transmitted pulse, as it is in the case of reflection by stationary objects. Even if the reflecting object be moving, thereby giving rise to a frequency shift, such shift is usually not significant for the purpose of the system and is ordinarily disregarded. Accordingly, a simple overall test of the transmitter and receiver may be made by connecting, in place of or in addition to the antenna, a cavity resonator or "echo box" which, upon excitation by a pulse from the transmitter, resonates or "rings" for an appreciable length of time after cessation of the exciting pulse. A portion of the energy in the resonator flows back to the receiver which, if operating properly, generates an output voltage the presence of which can be observed by a suitable indicator.

Airborne Doppler navigation systems transmit one or more beams of microwave energy which, after reflection by the ground, are returned to the aircraft and exhibit a change in frequency. In such systems this change in frequency is of the essence and the receiver is designed to produce an output indicative of the change, which change is indicative of the velocity of the aircraft with respect to the ground. Therefore, a simple echo box which returns energy at the transmitter frequency, cannot adequately test the performance of the system.

In the past the overall operation of Doppler radar navigation systems such as above described have been checked by using a specially designed test set coupled to the transmission line leading to the antenna. Such a test set comprises, in general, a microwave oscillator triggered by the receipt of a transmitter pulse and swept in frequency over a range of ten or more megacycles per second. The sensitivity of the receiver over this range of frequencies can then be measured. Such a test set, although widely used, has left much to be desired. It is expensive, it must be tuned carefully in order to operate, and requires complex power supplies. It does not return a signal closely approximating a normal Doppler return signal and cannot readily be adapted to do so.

It is a general object of the present invention to provide test equipment suitable for checking the operation of a Doppler navigation receiver-transmitter. A more specific object is to provide test equipment which is inexpensive, easy to operate, and which requires only a simple power supply. A further object is to provide test equipment in which the return signal closely approximates a normal Doppler return signal.

Briefly stated, the invention comprises apparatus which abstracts a portion of the energy emitted by the transmitter and which modulates this energy at a frequency which is low compared to the transmitter frequency. This low frequency in general covers the range of Doppler frequency shift for which the system is designed. The resulting modulated energy serves as a simulated echo return and is introduced into the receiver. If both transmitter and receiver are operating properly, the presence of the simulated signal can be observed on a suitable indicator at the receiver output.

For a clearer understanding of the invention reference may be made to the following detailed description and the accompanying drawing in which.

Figure 1:
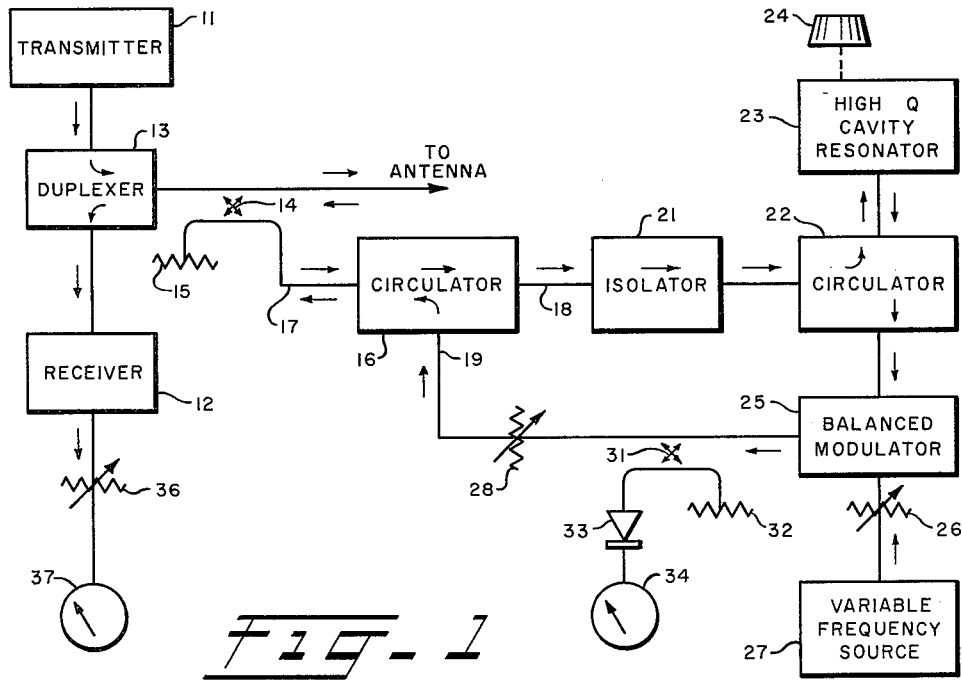
FIGURE 1 is a schematic diagram of one form of the invention as applied to a pulsed system using a single antenna for transmission and reception.

The invention will first be described for illustrative purposes in connection with a pulsed system employing the same antenna array for both transmission and reception although, as will be more fully explained, the invention is also suitable for use with other classes of radar systems. As shown in FIGURE 1, such a pulsed radar navigation system comprises a microwave transmitter 11 and receiver 12 both connected to the same antenna system by means of a conventional duplexer 13. Such systems frequently include a component such as a directional coupler 14 for abstracting energy from and/or introducing energy into the transmission line between the duplexer and the antenna. The directional coupler 14 has one arm terminated in an absorptive load 15 while the remaining arm is available for test purposes.

The test instrument proper includes a circulator 16 having one terminal 17 connected to the test arm of the directional coupler 14 and provided with two additional terminals 18 and 19. If no directional coupler connection is available, the circulator 16 may be connected in place of the antenna. The purpose of the circulator 16 is to transmit microwave energy freely from terminal 17 to terminal 18 but not to terminal 19 and from terminal 19 to terminal 17 but not to terminal 18. The circulator 16 may be any of various kinds such as a ferrite polarization rotator or a waveguide hybrid junction but it is at present preferred to employ a kind recently made available comprising a rectangular waveguide with an H plane junction provided with a ferrite rod positioned transversely within the junction and subjected to a magnetic field. One suitable example of the latter is commercially available from Kearfott Division of General Precision, Inc., 1150 McBride Avenue, Little Falls, New Jersey, and is identified as Model No. 4103001.

The terminal 18 of the circulator 16 is connected to an isolator 21 such as a commercially available ferrite device which transmits energy freely from left to right but absorbs energy travelling from right to left. The isolator 21 is connected to another circulator 22, similar to the circulator 16, which transmits energy as shown by the arrows. Energy from the isolator 21 passes through the circulator 22 to a high Q resonant circuit such as a cavity resonator or "echo box" 23 which is mechanically tunable by means of a knob 24. The remaining terminal of the circulator 22, which receives energy from the resonator 23, is connected to one input terminal of a balanced modulator 25, the other input terminal of which is connected through an attenuator 26, which may be a simple potentiometer, to a variable frequency source 27 such as a vacuum tube or transistor oscillator which is variable over the range of Doppler frequencies expected, for example from 1 to 20 kc. p.s. The modulator 25 is of the balanced type so that the output contains substantially no energy at the carrier (transmitter) frequency. The output of the modulator 27 is connected, through a precision, calibrated, microwave attenuator 28, to the terminal 19 of the circulator 16.

Means are provided for monitoring the power flowing in the line between the modulator 25 and the attenuator 28. As schematically shown in FIGURE 1, this means comprises a waveguide directional coupler 31 two arms of which are the sections of waveguide line connecting the modulator 25 to the attenuator 28, the third arm of which is terminated in an absorptive load 32, and the fourth arm of which contains a crystal rectifier 33 the current through which may be observed by meter 34.

The output of the receiver 12 is connected through an attenuator 36, which may also be a simple potentiometer, to a meter 37.

Radar receivers such as the receiver 12 are usually provided with automatic gain control (AGC) circuits which maintain the output reasonably constant for various input signal intensities. Accordingly it is desirable to disable such circuits by grounding or otherwise suitably biasing the AGC bus or busses serving the radio frequency and video amplifier stages before utilizing the test instrument of the present invention. Such biasing permits the adjustment of the receiver for maximum sensitivity to low level input signals and also allows the effect of changes of input signal intensity to be observed on the output meter 37.

In operation, after the AGC busses are suitably biased, the transmitter 11, receiver 12 and source 27 are turned on and allowed to warm up. The resonator 23 is tuned to the transmitter frequency which may, for example, be 8800 mc. p.s. The attenuators 26 and 28 are set for maximum (preferably infinite) attenuation. Although no signal is applied to the receiver 12, there will be an output due to inherent noise which output will be indicated by a deflection of the meter 37. The attenuator 36 is adjusted to provide a convenient deflection, such as one-quarter of full scale.

With the attenuator 28 still set for maximum attenuation, modulation is applied by decreasing the attenuation of the attenuator 26. If the transmitter 11 is operating properly and if the resonator 23 is tuned to the transmitter frequency, microwave energy at a frequency displaced from that of the transmitter by the frequency of the source 27 will appear at the output of the modulator 25 and the presence of this energy will be indicated by a deflection of the meter 34. The attenuator 26 is adjusted to provide a convenient deflection, for example half scale, and with the characteristics of the directional coupler 31, the crystal 33 and the meter 34 all known, the indication of meter 34 is a measure of the power output of the modulator.

Next the attenuation of the calibrated attenuator 28 is reduced. If the receiver 12 is operating properly, the indication of meter 37 will increase. A quantitative indication of receiver operation can be made, for example, by noting with the aid of the meter 37 and the attenuator 28, the amount of input signal power required to double the previously noted reading of the meter 37. Receiver sensitivity at various frequencies can be checked by varying the frequency of the source 27.

Figure 2:
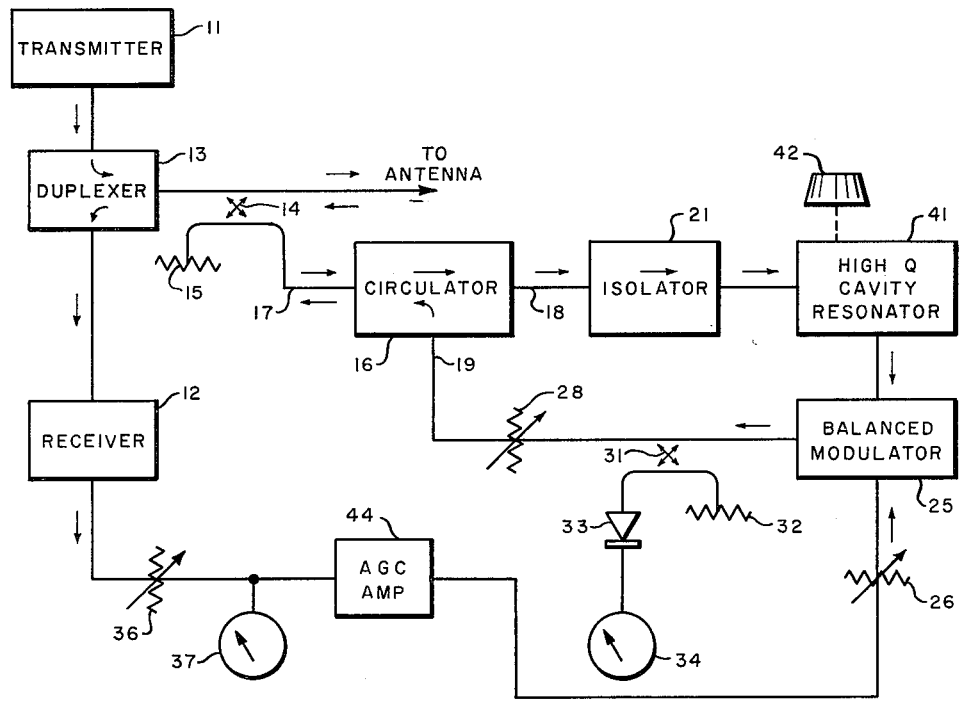
FIGURE 2 is a schematic diagram of another form of the invention as applied to the same kind of system.

FIGURE 2 illustrates another embodiment of the invention. Many of the components are identical to those of FIGURE 1 and have been denoted by the same reference characters. Microwave energy from the transmitter 11 flows through the duplexer 13, the directional coupler 14, the circulator 16 and the isolator 21 as before. The need for the circulator 22 of FIGURE 1 has been eliminated by employing a cavity resonator 41 tunable by means of a knob 42 and having two coupling arrangements (probes, loops, or irises) instead of one. The isolator 21 is connected to the first coupling in order to excite the resonator while the second coupling extracts a small portion of the energy which is led to the balanced modulator 25. As before, the output of the modulator 25 is passed through the calibrated attenuator 28 to the circulator 16 from whence it flows through the directional coupler 14 and the duplexer 13 to the receiver 12. As before, the output of the modulator 25 is monitored by means of the directional coupler 31, the crystal rectifier 33 and the meter 34.

The modulation arrangement in the embodiment of FIGURE 2 is different from that of FIGURE 1. In an airborne Doppler radar system, the received signal is not a simple sine or square wave but, due to the nature of the reflection process, is a spectrum of frequencies similar in character to band limited noise. A better test of receiver functioning can be obtained by employing, as a test signal, a signal more nearly approaching in form that received in actual operation. This is accomplished by making use of the fact that nearly all Doppler receivers, such as the receiver 12, include a low pass filter which inherently limits the band of frequencies passed to the output. Therefore the output, in the absence of an input signal, is essentially band limited noise and thus is similar in form to the signal received in actual operation except that the bandwidth of the receiver output is wider than that of any normal signal received at any one time.

In accordance wtih the embodiment of FIGURE 2, the output of the receiver 12 is used as a modulation source. The output of receiver 12 is connected, as before, through the attenuator 36 to the meter 37. In addition, the attenuator 36 is connected to the input of an amplifier 44 having an automatic gain control circuit to hold the output substantially constant. The output of the amplifier 44 is connected to the attenuator 26 which in turn is connected, as before, to the input of the modulator 25. By this arrangement the microwave energy from the resonator 41 is modulated by noise and led to the receiver 12.

Operation is similar to the embodiment of FIGURE 1. The transmitter 11 and receiver 12 are turned on and after warm up the resonator 41 is tuned to the transmitter frequency. With the attenuators 26 and 28 adjusted for maximum (infinite) attenuation, the attenuator 36 is adjusted to provide a convenient deflection of the meter 37. Next some receiver noise is applied to the modulator 25 by decreasing the attenuation of attenuator 26. Adjustment is continued until the meter 34 reads some convenient power level. Finally, modulated microwave power is applied to the receiver by decreasing the attenuation of the attenuator 28. If everything is operating properly the deflection of meter 37 will increase and, as before, the amount of signal required to double the receiver output can be determined by adjusting the attenuator 28 and observing the meter 37.

From the foregoing it is apparent that the present invention constitutes a simple and inexpensive test set. The elimination of the need for a microwave oscillator eliminates its cost and the need for an expensive high voltage power supply. Power for the source 27 of FIGURE 1 or the amplifier 44 of FIGURE 2 can be obtained from a simple auxiliary supply or could be "stolen" from the receiver 12. Additionally, the present invention tests the receiver with a modulated signal more nearly approaching the kind of signal encountered in actual operation.

Figure 3:
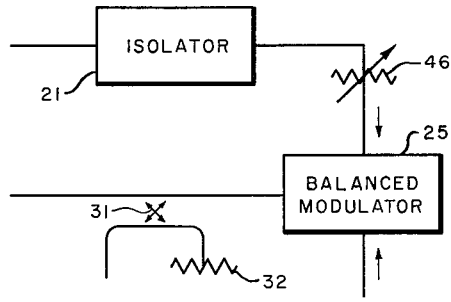
FIGURE 3 is a schematic diagram showing how the invention may be used with a continuous wave system.

Although the invention has been described as applied to a pulsed system using the same antenna array for both transmission and reception, some features may also be used with continuous wave (CW) systems and/or systems employing separate antennas for transmission and reception. In the case of a CW system, no resonator is required and the isolator 21 may be connected directly or, as illustrated in FIGURE 3, through an attenuator 46 to the input of the modulator 25. The remainder of the circuit may be in accordance with that of either FIGURE 1 or FIGURE 2.

Figure 4:
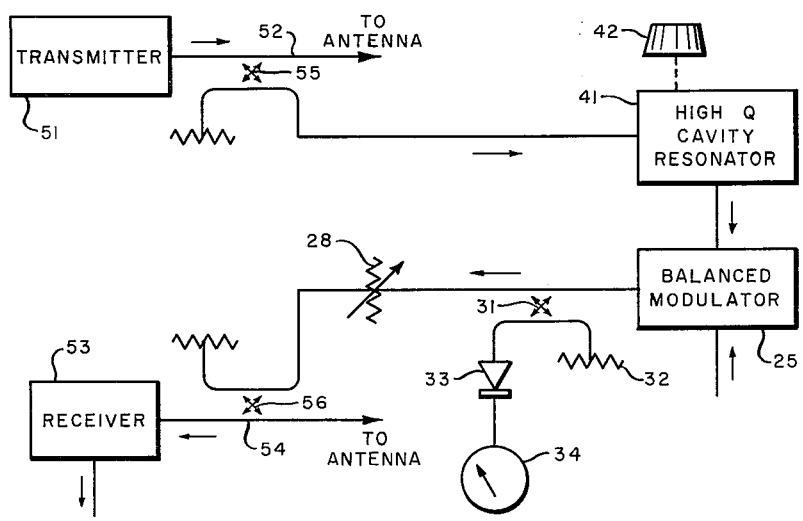
FIGURE 4 is a schematic diagram showing how the invention may be used with a system employing separate antennas for transmission and reception.

If separate antennas are used for transmission and reception, whether with a CW or a pulsed system, the coupling problem is considerably simplified. FIGURE 4 illustrates one arrangement which can be used with a pulsed system employing separate antennas. There is shown a transmitter 51 connected to a waveguide 52 which leads to a transmitting antenna (not shown). A receiver 53 is connected to a waveguide 54 which leads to a receiving antenna (not shown). A portion of the energy from the transmitter 51 is abstracted from the waveguide 52 by a directional coupler 55 and led to the resonator 41. As in FIGURE 2, a portion of the energy stored in the resonator 41 is led to the modulator 25. The output of modulator 25 is monitored by the meter 34, controlled in magnitude by the calibrated attenuator 28, and introduced into the waveguide 54 through a directional coupler 56. The remainder of the circuit may be as shown in FIGURE 2 and operation is similar to that previously described.

While specific embodiments have been described for illustrative purposes, many modifications can be made within the spirit of the invention. It is therefore desired that the protection afforded by Letters Patent be limited only by the true scope of the appended claims.

What is claimed is:

1. Test equipment for checking the operation of a radar transmitter and receiver, comprising, means for collecting a portion of the energy emitted by said transmitter, a modulator, means for applying the energy so collected to said modulator, circuit means for connecting the output of said receiver to said modulator, means included in said circuit means for controlling the amount of energy from said receiver which is applied to said modulator, means for applying the output of said modulator to the input of said receiver, means for controlling the amount of energy from said modulator which is applied to the input of said receiver, and means for measuring the output of said receiver.

2. Equipment for testing the operation of a radar transmitter and receiver, comprising, means for measuring the output of said receiver, a cavity resonator, means for exciting said resonator with energy generated by said transmitter, a balanced modulator, means for coupling energy from said resonator to said modulator, first circuit means for coupling energy appearing at the output of said receiver to said modulator, a first attenuator included in said first circuit means for varying the magnitude of the receiver output applied to said modulator, means for measuring the output of said modulator, second circuit means for applying the output of said modulator to the input of said receiver, and second attenuating means included in said second circuit means for controlling the amount of energy applied to the input of said receiver.

References Cited in the file of this patent

UNITED STATES PATENTS

| | | |
|---|---|---|
| 2,683,855 | Blitz | July 13, 1954 |
| 2,801,049 | Richmond | July 30, 1957 |
| 2,836,813 | Flower et al. | May 27, 1958 |
| 2,872,673 | Pleasure | Feb. 3, 1959 |
| 2,914,765 | Hutchins | Nov. 24, 1959 |
| 2,952,848 | Zahalka et al. | Sept. 13, 1960 |